US012591139B2

(12) United States Patent
Cakmakci et al.

(10) Patent No.: US 12,591,139 B2
(45) Date of Patent: Mar. 31, 2026

(54) CURVED LIGHTGUIDE IN A SEE-THROUGH SHELL

(71) Applicant: GOOGLE LLC, Mountain View, CA (US)

(72) Inventors: Ozan Cakmakci, San Mateo, CA (US); Oscar Alberto Martinez, San Diego, CA (US); Eliezer Glik, San Diego, CA (US); Han Zhang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 399 days.

(21) Appl. No.: 18/130,601

(22) Filed: Apr. 4, 2023

(65) Prior Publication Data

US 2024/0337839 A1 Oct. 10, 2024

(51) Int. Cl.
*G02B 27/01* (2006.01)

(52) U.S. Cl.
CPC .. *G02B 27/0172* (2013.01); *G02B 2027/0178* (2013.01)

(58) Field of Classification Search
CPC ................................................. G02B 27/0172
See application file for complete search history.

(56) References Cited

U.S. PATENT DOCUMENTS

| | | | | |
|---|---|---|---|---|
| 8,384,999 B1* | 2/2013 | Crosby | .............. | G02B 27/0172 |
| | | | | 359/410 |
| 9,389,422 B1 | 7/2016 | Cakmakci et al. | | |
| 10,437,064 B2* | 10/2019 | Popovich | ............. | G02B 6/0016 |
| 2006/0119951 A1* | 6/2006 | McGuire | ............ | G02B 27/1026 |
| | | | | 359/630 |
| 2012/0162549 A1* | 6/2012 | Gao | ........................ | G02B 6/003 |
| | | | | 359/651 |
| 2015/0177519 A1* | 6/2015 | Cakmakci | .......... | G02B 27/0172 |
| | | | | 359/631 |
| 2017/0010465 A1* | 1/2017 | Martinez | ................ | G02C 11/10 |
| 2020/0150330 A1* | 5/2020 | Danziger | ........... | G02B 27/0172 |

OTHER PUBLICATIONS

Cakmakci, O. et al., "Head-Worn Displays: A Review", Journal of Display Technology, vol. 2, Issue 3, Sep. 2006; pp. 199-216.
Kress, B. et al., "Waveguide Combiners for Mixed Reality Headsets: A Nanophotonics Design Perspective", Nanophotonics 10.1; Oct. 7, 2020; pp. 41-74.

(Continued)

*Primary Examiner* — Tina Wong

(57) ABSTRACT

A head mounted display includes an eyeglasses frame, a lens framed in the eyeglasses frame, and a light engine disposed in the eyeglasses frame. The lens includes an optical shell comprising a world-facing spherical surface and an opposing eye-facing surface and a curved lightguide disposed in the optical shell. The curved lightguide includes an incoupler surface, a first freeform surface facing the world-facing spherical surface, and a second freeform surface facing the eye-facing surface. The lens further includes a first low refractive index region disposed between the first freeform surface and a first conformal freeform surface of the optical shell and a second low refractive index region disposed between the second freeform surface and a second conformal freeform surface of the optical shell.

18 Claims, 6 Drawing Sheets

(56) References Cited

OTHER PUBLICATIONS

Mirza, K. et al., "Key Challenges to Affordable See Through Wearable Displays: The Missing Link for Mobile AR Mass Deployment", Proceedings of SPIE; May 2013; downloaded from <<https://www.researchgate.net/publication/271438396>> on Jan. 13, 2023; 8 pages.

Park, Soon-gi, "Augmented and Mixed Reality Optical See-Through Combiners Based on Plastic Optics", Frontline echnology; Jul. 19, 2021; downloaded from <<https://sid.onlinelibrary.wiley.com/doi/full/10.1002/msid.1226<< on Jan. 13, 2023; 6 pages.

Zhan, T. et al. "Augmented Reality and Virtual Reality Displays: Perspectives and Challenges", iScience; vol. 23, Issue 8, 101397; Aug. 21, 2020; 13 pages.

* cited by examiner 206     208

202     204

200 nm

CURVED LIGHTGUIDE IN A SEE-THROUGH SHELL

BACKGROUND

Wearable electronic eyewear devices include optical systems that magnify a display image and deliver a virtual image into the field of view (FOV) of a user. In some cases, wearable electronic eyewear devices also allow the user to see the outside world through a lens or see-through eyepiece. Some wearable electronic eyewear devices incorporate a near-to-eye optical system to display content to the user. These devices are typically referred to as head-mounted displays (HMDs). For example, conventional HMD designs include a microdisplay ("display") positioned in a temple or rim region of a head wearable frame like a conventional pair of eyeglasses. The display generates images, such as computer-generated images (CGI), that are conveyed into the FOV of the user by optical elements such as lightguides deployed in the lens (or "optical combiner") of the head wearable display frame. The wearable electronic eyewear device can therefore serve as a hardware platform for implementing augmented reality (AR) or mixed reality (MR).

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
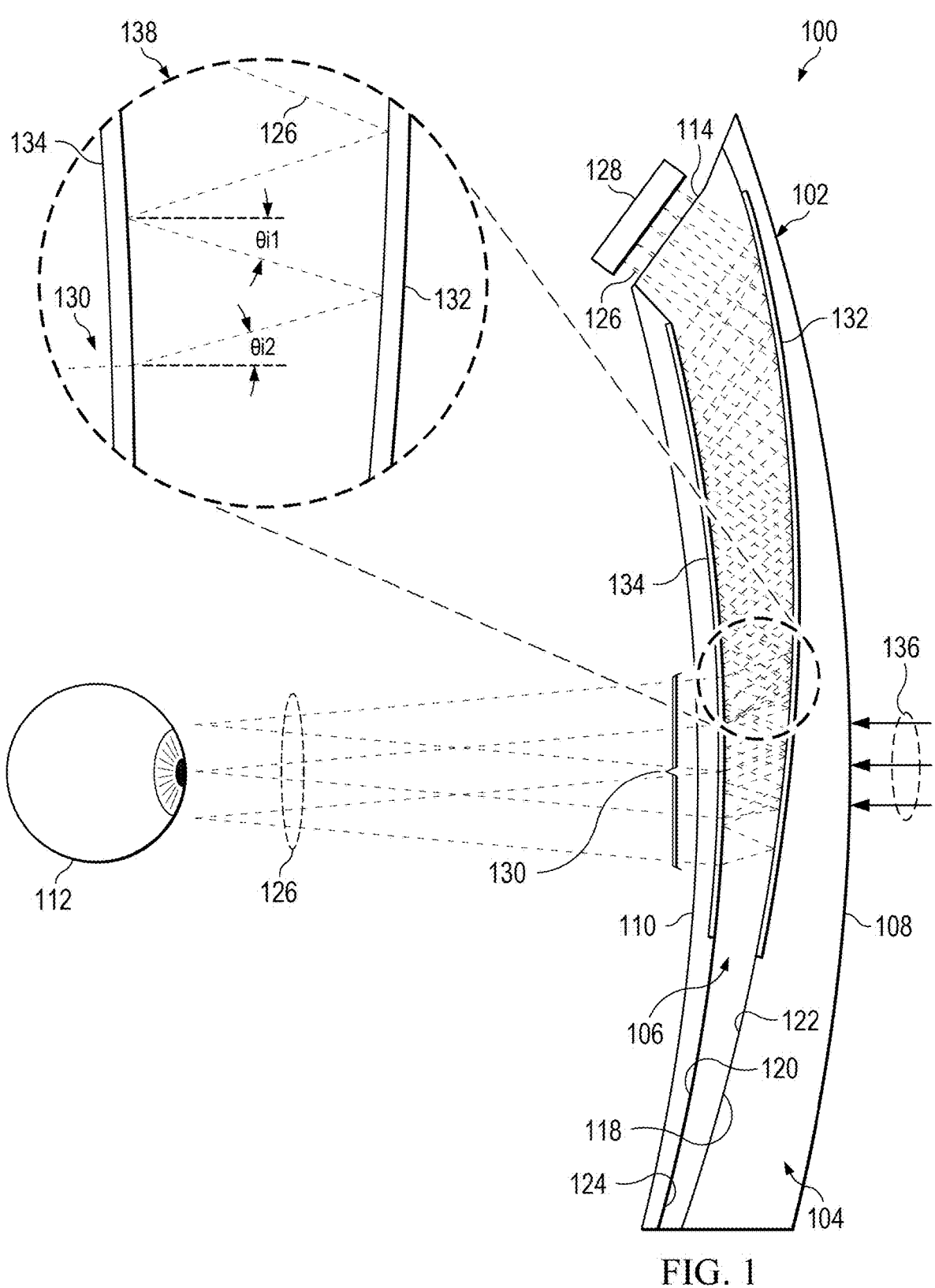
FIG. 1 is a diagram of a cross-section view of a lens comprising a curved lightguide within a curved optical shell in accordance with some embodiments.
Figure 2:
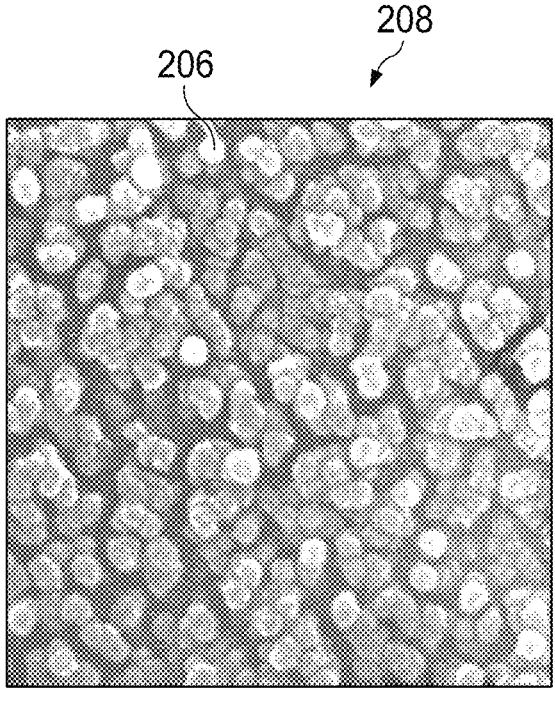
FIG. 2 is a diagram illustrating two top views of two nanostructure layers implementable for a low refractive index region of the curved lightguide of FIG. 1 in accordance with some embodiments.
Figure 2:
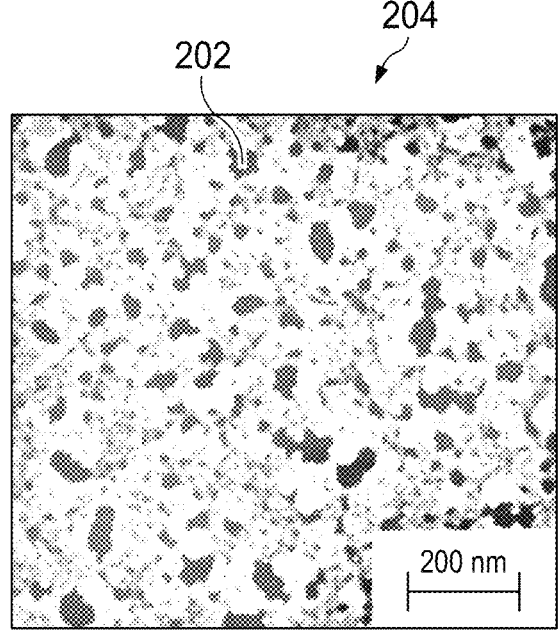

Head-mounted displays (HMDs) have multiple practical and leisure applications, but the development and adoption of wearable electronic display devices have been limited by constraints imposed by the optics, aesthetics, manufacturing process, thickness, field of view (FOV), and prescription lens limitations of the optical systems used to implement existing display devices. For example, the geometry and physical constraints of conventional designs result in displays having relatively small FOVs and relatively thick optical combiners. The optical performance of an HMD is an important factor in its design; however, users also care significantly about aesthetics of wearable devices. Independent of their performance limitations, many of the conventional examples of wearable heads-up displays have struggled to find traction in consumer markets because, at least in part, they lack fashion appeal. Some wearable HMDs employ planar lightguides in planar transparent combiners and, as a result, appear very bulky and unnatural on a user's face compared to the sleeker and more streamlined look of typical curved eyeglass and sunglass lenses. Moreover, the presence of these planar surfaces introduces the potential for undesirable cosmetic flash.

To address these issues and others, FIGS. 1-6 describe embodiments of a lens employable in an HMD or other near-eye display, in which a curved lightguide is implemented withing a curved optical shell resulting in a lens that is, in effect, a lightguide within a lightguide. In some embodiments, the curved lightguide has an incoupler surface to receive display light from a microdisplay or other light engine, and two substantially opposing freeform surfaces, including a first freeform surface facing the world (that is, "world-side") and a second freeform surface facing a user's eye (that is, "eye-side"). The curved optical shell has a world-side spherical surface and an opposing eye-side surface, which likewise may be spherical so as to implement no optical power, or which may be a freeform surface to implement an optical prescription, such as a diopter adjustment. Disposed between the freeform surfaces of the curved lightguide and the corresponding conforming freeform mating surfaces in the material of the curved optical shell are corresponding low refractive index regions, which may be formed as one or more layers of nanostructures within the material(s) of the optical shell or the curved lightguide, as one or more low refractive index films or coatings, or a combination thereof.

In some embodiments, the shapes of the first and second freeform surfaces, the orientation of the incoupler surface, the distribution and composition of the low refractive index regions, and the ratio between the refractive index of the material of the curved lightguide and the refractive index(es) of the low refractive index regions together operate to efficiently propagate display light incident on the incoupler surface through the curved lightguide to an outcoupler region on the second freeform surfacing facing the user's eye via total internal reflection (TIR). Upon reaching the outcoupler region, the propagated display light has an incident angle that is less than the critical angle of the interface between the material of the curved lightguide and the adjacent low refractive index region, and thus the propagated display light is outcoupled, or exits, the curved lightguide at the outcoupler region of the second freeform surface, whereupon the outcoupled display light is transmitted through the material of the curved optical shell and exits the curved optical shell toward the user's eye.

Thus, the shapes of the first and second freeform surfaces, the particular type or form of the low refractive index regions, the distribution or positioning of the low refractive index regions along the dimensions of the first and second freeform surfaces, as well as the material of the curved lightguide itself (and thus, correspondingly, its refractive index), thus all may be selected, configured, co-optimized or otherwise designed to provide a curved lightguide embedded within a corresponding curved optical shell that serves to propagate display light through the curved lightguide via TIR and then allow the exit of the propagated display light at a specified region and in a specified direction toward the expected position of a user's eye without necessitating the use of conventional additive outcoupling mechanisms, such as diffractive gratings, hologram optical elements, and the like. Moreover, because the curved lightguide also can operate to collimate input display light from a pinpoint light source, separate collimating optical elements are not required. Further, the surfaces of the curved optical shell in which the curved lightguide is embedded permits ambient light incident on the world-side spherical surface to transmit through to the curved optical shell and the curved lightguide to the eye-side spherical surface and onward toward the user's eye without significant refraction or other optical impact (assuming the eye-side surface 108 is likewise spherical). That is, the composition of the low refractive index regions is such that the low refractive index regions do not noticeably interfere with the transmission of this ambient light through the lens (e.g., the regions may employ nano-structures smaller than the wavelengths of visible light) and thus the lens also may operate as a see-through or pass-through lens for allowing the user observation of the surrounding environment.

FIG. 1 illustrates a cross-section view 100 of a lens 102 that serves as a curved lightguide-within-a-lightguide in accordance with some embodiments. The lens 102 includes a curved optical shell 104 in which a curved lightguide 106 is embedded or otherwise implemented. The curved optical shell 104 is composed of a suitable optical material (e.g., optical plastic or glass) defined in part by a first spherical surface 108 facing the "world" or surrounding environment and an opposing second surface 110 facing an expected position of a user's eye 112 (when the lens 102 is implemented in an HMD or other near-eye display). As references to their intended orientations, the first spherical surface 108 and the second surface 110 are referred to herein as the "world-side spherical surface 108" and the "eye-side surface 110", respectively. In some embodiments, the surfaces 108 and 110 each defines a spherical surface (that is, a surface that defines a constant and equal radius in all directions), with the world-side spherical surface 108 defining a convex spherical surface with a radius R1 and the eye-side spherical surface 110 defining a concave spherical surface with a radius R2, where R1 and R2 may be the same or different radii. In other embodiments, the eye-side surface 110 may be a freeform surface for purposes of implementing a diopter adjustment or other prescriptive correction.

The curved lightguide 106 is disposed between the surfaces 108 and 110 and likewise is composed of a suitable optical material (e.g., optical plastic or glass) defined in part by an incoupler surface 114, a first freeform surface 118, and an opposing second freeform surface 120, with the incoupler surface 114 disposed between the two freeform surfaces 118, 120 and, in some embodiments, implemented as a planar, or flat, surface. The term "freeform surface," as is understood in the art and as used herein, refers to a surface that does not have symmetry around any axis. The first freeform surface 118 faces the anticipated position of the user's eye 112, and thus is referred to herein as the "eye-side freeform surface 118", while the second freeform surface 120 faces the "world" or surrounding environment, and thus is referred to herein as the "world-side freeform surface 120." Although an embodiment of the lens 102 is illustrated in which the freeform surfaces 118 and 120 extend the entire span of the lens 102 (that is, extending from proximate to the incoupler surface 114 to the opposing "bottom" side of the lens 102) and thus the curved lightguide 106 extends the entire span of the lens 102 and thus is "sandwiched" between two opposing shell bodies implementing the optical shell 104, in other embodiments, one or both of the freeform surfaces 118 or 120 terminate prior to the "bottom" side of the lens 102, in which case the curved lightguide 106 slots into a corresponding slot within a single shell body implementing the optical shell 104.

In some embodiments, the shapes of the freeform surfaces 118 and 120 are described by a height (also referred to as a sag) z from each point (x,y) along a plane, wherein r is a base sphere term and j is an index:

$$z = \frac{cr^2}{1 + \sqrt{1 - (1+k)c^2 r^2}} + \sum_{j=2}^{66} C_j x^m y^n \qquad (1)$$

where $$j = \frac{(m+n)^2 + m + 3n}{2} + 1 \qquad (2)$$

The coefficients used in equations (1) and (2) may be the same for each of the freeform surfaces 118 and 120, or different coefficients may be used for each of the freeform surfaces 118 and 120, depending on the design optimizations.

As noted above, the curved lightguide 106 is "embedded" in the curved optical shell 104, and thus the optical material of the curved optical shell 104 is further defined by a freeform surface 122 adjacent to, and conformal to (that is, having the same or substantially similar shape as), the word-side freeform surface 118, and an opposing freeform surface 124 adjacent to, and conformal to, the eye-side freeform surface 120. The facing pair of conforming freeform surfaces 118 and 122 may be at least partially bonded together via an optical adhesive, and the facing pair of conforming freeform surfaces 120 and 124 likewise may be at least partially bonded together via an optical adhesive.

In at least one embodiment, as illustrated by the depicted ray traces, the curved lightguide 106 operates to propagate display light 126 output by a light engine 128 and incident on the incoupler surface 114 through the curved lightguide 106 to an outcoupler region 130 in the eye-side freeform surface 120, whereupon the propagated display light 126 is outcoupled from the curved lightguide 106 and transmitted through the intervening material of the curved optical shell 104 to the eye-side surface 110, and from the eye-side surface 110 toward the expected position of the user's eye 112. To facilitate incoupling of the display light 126, the incoupler surface 114 can utilize any of a variety of incoupling features, including diffraction gratings, holograms, holographic optical elements (e.g., optical elements using one or more holograms), volume diffraction gratings, volume holograms, surface relief diffraction gratings, surface relief holograms a reflective mirror, a reflective freeform surface, and the like.

Further, in at least one embodiment the curved lightguide 106 relies on total internal reflection (TIR) of the display light 126 between the two opposing freeform surfaces 118 and 120 until the propagated display light 126 reaches the outcoupler region 130 of the eye-side freeform surface 120. As will be understood by a skilled artisan, the condition of TIR within a lightguide or other structure is met when the angle of incidence $\theta_i$ of a light ray, as measured relative to the normal of the boundary surface, is greater than the critical angle $\theta_c$, which may be derived from Snell's Law as $\sin \theta_c = n2/n1$, where n1 is the refractive index for the material of the lightguide and n2 is the refractive index of the material at the boundary of the lightguide (that is, of the material that serves to bound the incident surface of the lightguide). Thus, it will be appreciated that, for a given refractive index n1 for the material of a lightguide, the critical angle $\theta_c$ decreases as the refractive index of the material at the boundary of the lightguide decreases. As such, the boundary material having a lower refractive index permits a more aggressive design for a lightguide (e.g., by providing a larger field-of-view) while maintaining TIR, including use of a material for the lightguide that has a higher refractive index, as well as more aggressive geometries between the incoupler, TIR surfaces, and outcoupler of the lightguide.

Generally, simply adhering the freeform surfaces 118 and 120 of the curved lightguide 106 to the corresponding conforming freeform surfaces 122 and 124, respectively, of the optical shell 104 using an optical adhesive, without more, typically would be insufficient to achieve TIR as most, if not all, current commercially-available optical adhesives lack a sufficiently low refractive index relative to the refractive index of the material of the curved lightguide 106. For example, polymethylmethacrylate (that is, "acrylic") typically has a refractive index n1 of 1.502 and Norland Optical Adhesive (NOA) 84 is an optical adhesive with an refractive index n2 of 1.460, which is particularly low for an optical adhesive. As such, the critical angle $\theta_c$ for TIR with the implementation of such materials would be $\theta_c$=76.418 degrees, which is an angle sufficiently large to frustrate compact and efficient lightguide design. Another example would be the LAM-134 optical adhesive from MY Polymers having a refractive index n2 of 1.346. Accordingly, to facilitate TIR propagation of the display light 126 within the curved lightguide 106 and to facilitate outcoupling of the TIR-propagated display light 126 from the curved lightguide 106 while permitting more advantageous lightguide dimensions and geometries, in at least one embodiment the lens 102 further includes at least one low refractive index region 132 disposed at the interface, or boundary, between the conforming freeform surfaces 118 and 122 and at least one low refractive index region 134 disposed at the interface, or boundary, between the conforming freeform surfaces 120 and 124. As shown by cross-section view 100, the low refractive index regions 132 and 134 (referred to as "low index regions" for ease of reference) cover at least a portion of the respective interface/boundary between corresponding conforming freeform surfaces and, as described in greater detail below, define a TIR-based propagation path for the display light 126 from the light engine 128 and incident on the incoupler surface 114. The low index regions 132 and 134 each has a low refractive index, wherein a low refractive index is defined as an absolute refractive index n2 of $1 < n2 < 1.3$ (e.g., n2≈1.2) at the Fraunhofer $D_2$ line at 588.995 nanometers wavelength.

The low index regions 132 and 134 may be implemented in any of a variety of ways. In some embodiments, one or both of the low index regions 132 or 134 is implemented as an optical film or optical coating, such as chiolite, that has a sufficiently low refractive index and which is applied to the corresponding freeform surface of the curved lightguide 106 (or to the facing conforming freeform surface of the optical shell 104). In other embodiments, one or both of the low index regions 132 or 134 may be implemented using one or more layers of three-dimensional (3D) optical nanostructures (hereinafter, simply "nanostructures" for brevity) formed in, deposited at, and/or etched into the surface material at the corresponding freeform surface of the curved lightguide 106 (or in the corresponding conformal freeform surface of the optical shell 104), and thus turning the corresponding processed surface into a 3D nanostructured surface. Generally, such nanostructures include various shapes, including sponge, spherical, columnar, mushroom cap, etc., dimensioned at tens or hundreds of nanometers with no or smaller gaps, spaces, or empty volumes, that together operate at visible light wavelength dimensions to be effectively optically ineffective (that is, effectively transparent at visible light wavelengths) while providing effective low indices of refraction. For example, referring briefly to FIG. 2, a combination of a sponge-like nanostructure layer 202 having a height of approximately 90 nm (as shown by top view 204) may be capped by a layer of columnar nanostructures 206 having heights of approximately 250 nm (as shown by top view 208) formed in EP-9000 polycarbonate resin may provide an effective refractive index between 1.12 and 1.18 for visible light wavelengths. Such nanostructures may be formed using any of a variety of techniques, including photolithography-based etching. Examples of suitable nanostructures for use individually or in layered combination for the low index regions 132 and 134 are found in the following, the entireties of which are incorporated by reference herein: U.S. Pat. Nos. 8,192,639, 9,039,906, 10,539,716; U.S. Patent Application Publication No. 2009/0261063; and U.S. Patent Application Publication No. 2020/0081160.

Referring again to FIG. 1, as explained above, employing the low index regions 132 and 134 at the boundaries/interfaces of the freeform surfaces 118 and 120 of the curved lightguide 106 reduces the critical angle $\theta_c$ needed for TIR of the display light 126 withing the curved lightguide 106 and thus allows for implementation of a thinner lightguide, and thus a thinner lens 102. Moreover, as illustrated by expanded view 138, the shape of the freeform surfaces 118, 120, the dimensions of the curved lightguide 106, and the position and composition of the low index regions 132 and 134 can be configured together so that propagated display light 126 incident on the eye-side freeform surface 120 prior to the outcoupler region 130 has an incident angle $\theta_{i1}$ that is larger than the critical angle $\theta_c$ and thus is further propagated within the lightguide 106 via TIR, whereas the propagated display light incident on the eye-side freeform surface 120 within the outcoupler region 130 has an incident angle $\theta_{i2}$ smaller than the critical angle $\theta_c$ within the outcoupler region 130, which allows the TIR-propagated display light 126 to outcouple from the curved lightguide 106 at the outcoupler region 130 toward the eye 112 and through the eye-side material of the optical shell 104.

The critical angle $\theta_c$ within the outcoupler region 130 may be the same as the critical angle $\theta_c$ along the rest of the interface between the curved lightguide 106 and the low index region 134, and the dimensions and geometries of the curved lightguide 106 and its freeform surfaces 118 and 120 may be designed such that by the time the propagated display light 126 reaches the outcoupler region 130 after being reflected one or more times between the freeform surfaces 118 and 120, the incident angle $\theta_{i2}$ may exceed the same critical angle $\theta_c$ and thus cause the display light 126 to escape the curved lightguide 106. In other embodiments, the design of the low index region 134 is manipulated to increase the effective refractive index within the outcoupler region 130 and thus increase the critical angle $\theta_c$ within the outcoupler region 130, and thus causing the propagated display light 126 to exit the curved lightguide 106 through the outcoupler region 130 at lower incident angles $\theta_i$. For example, a subregion of less-dense nanostructures or of different types or layers of nanostructures could be employed, or the region of the freeform surface 120 aligned with the outcoupler region 130 could be substantially devoid of nanostructures or a low-index film or coating. Further, in some embodiments, additional outcoupling elements, such as HOEs or diffractive gratings, may be employed in the curved lightguide 106 at the outcoupler region 130 to facilitate outcoupling of the TIR-propagated display light 126.

Moreover, because the low index regions 132 and 134 are composed of nanostructures or a low-index film or coating that is optically ineffective, ambient light 136 incident on the world-side spherical surface 108 of the optical shell 104 may be transmitted through the lens 102 (including through the material of the optical shell 104, the curved lightguide 106, and the low index regions 132 and 134) toward the user's eye 112 without detectable optical interference. This allows the lens 102 to operate as a see-through optical element that permits the user's eye 112 to have a field of view (FOV) into the surrounding environment that is relatively unimpacted by the presence of the curved lightguide 106 embedded in the optical shell 104.

Although not shown in the example of FIG. 1, in some embodiments additional optical components are included in any of the optical paths between the light engine 128 and the incoupler surface 114, or between the outcoupler region 130 and the eye 112 (e.g., in order to shape the light for viewing by the eye 112 of the user). For example, in some embodiments, a prism (not shown) is used to steer light from the light engine 128 into the incoupler surface 114 so that light is incoupled at the appropriate angle to encourage propagation of the light in the curved lightguide 106 by TIR. Also, in some embodiments, an exit pupil expander is arranged in an intermediate stage between the incoupler surface 114 and the outcoupler region 130 to receive display light that is coupled into the curved lightguide 106, expand the display light, and redirect the display light towards the outcoupler region 130, whereupon the outcoupler region 130 then outcouples the expanded display light from the curved lightguide 106. Moreover, in some display applications, the display light 126 entering the incoupler surface 114 has a cone shape, and interactions with the optical surfaces of the curved lightguide 106 convert the cone into collimated light (i.e., parallel rays) so that it appears to a user as if the light originated at a distance in front of the user. As such, the lens 102 can be implemented without necessitating the use of collimating optics between the light engine 128 and the incoupler surface 114 in such instances.

Figure 3:
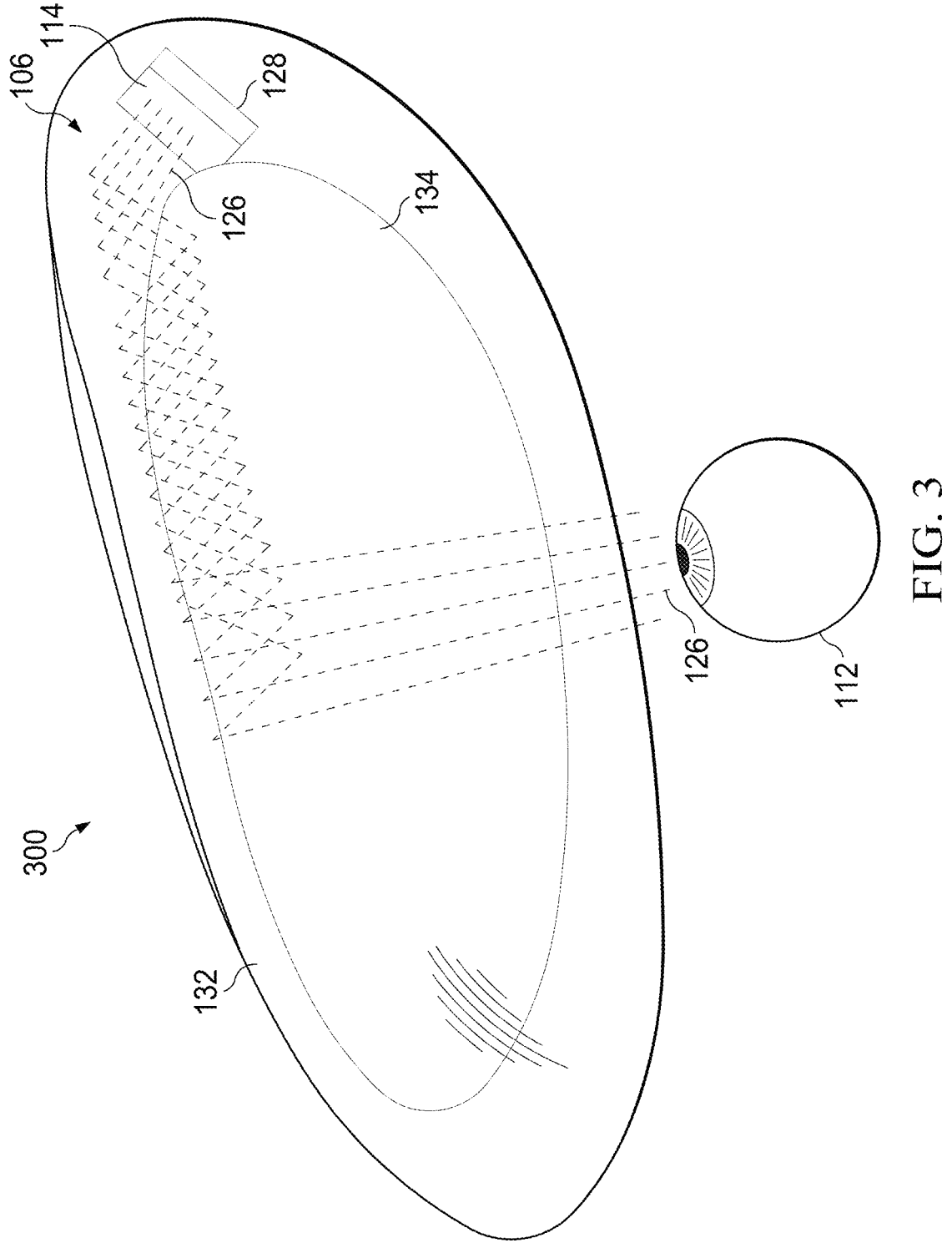
FIG. 3 is a diagram illustrating a three-dimensional perspective view of the curved lightguide of the lens of FIG. 1 in accordance with some embodiments.
Figure 4:
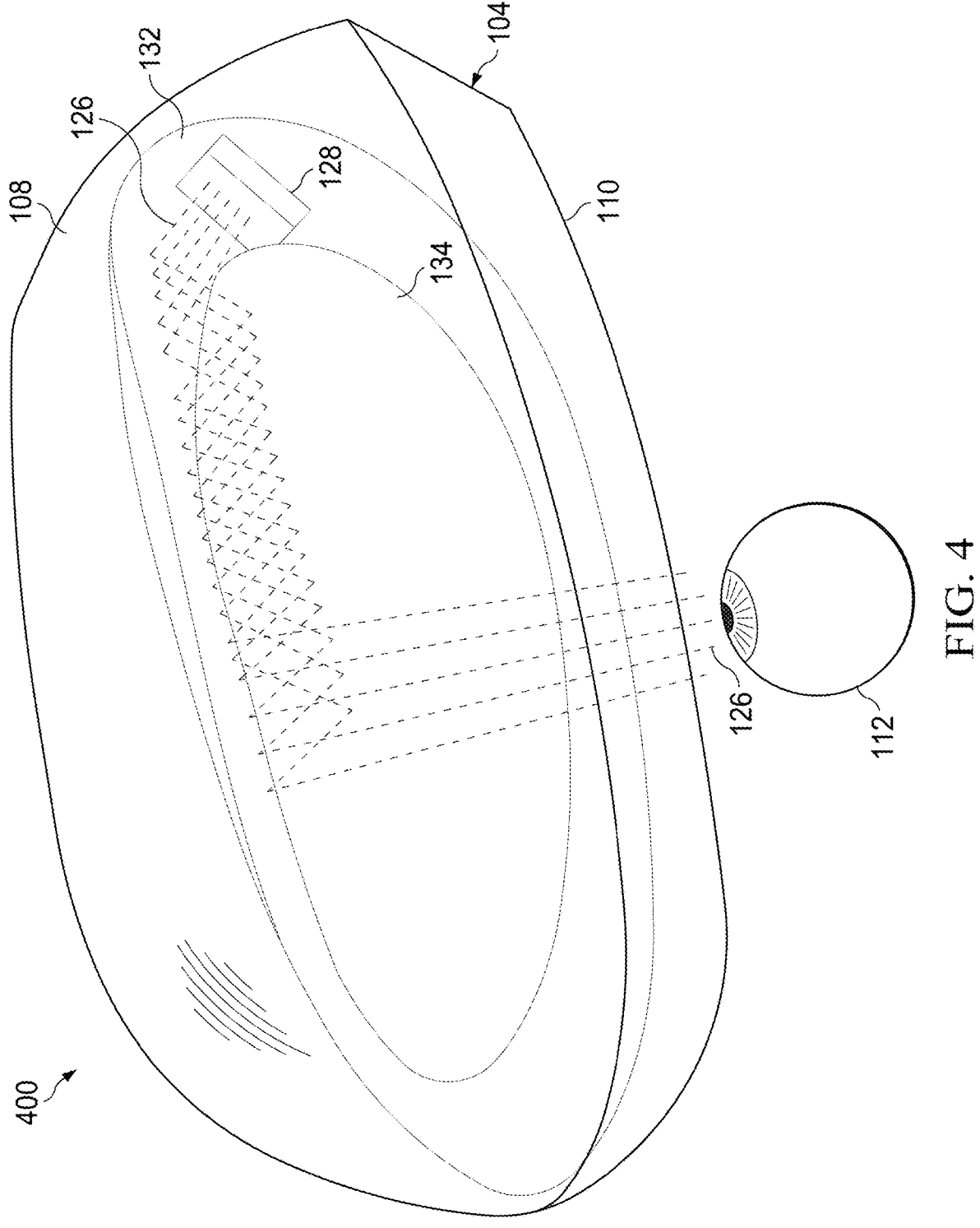
FIG. 4 is a diagram illustrating a three-dimensional perspective view of the lens of FIG. 1 including the curved lightguide of FIG. 3 in accordance with some embodiments.

FIG. 3 illustrates a top perspective view 300 of an implementation of the curved lightguide 106 (including the opposing freeform surfaces 118 and 120) and the light engine 128 with the optical shell 104 omitted relative to the user's eye 112 and FIG. 4 illustrates a top perspective view 400 of the lens 102 incorporating the curved lightguide 106 of FIG. 3 along with a corresponding implementation of the optical shell 104 (including opposing surfaces 108 and 110), along with the light engine 128.

Figure 5:
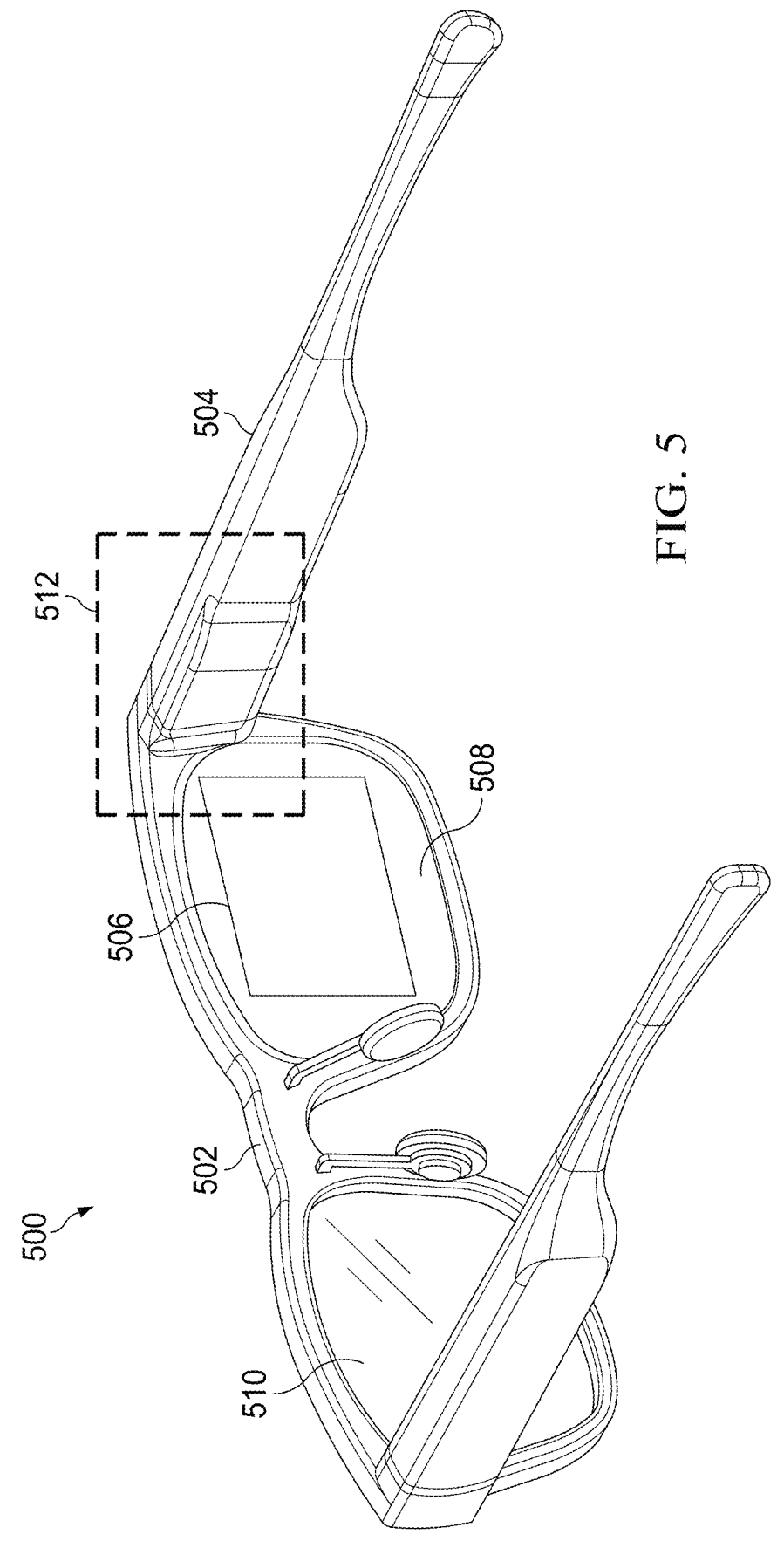
FIG. 5 is a diagram illustrating a rear perspective view of a head mounted display (HMD) having an eyeglasses form factor and employing the lens of FIGS. 1-4 in accordance with some embodiments.

FIG. 5 illustrates an example near-eye display system 500 (referred to as display system 500) employing the lens 102 accordance with some embodiments. In the depicted embodiment, the display system 500 is a near-eye display system in the form of a WHUD in which the support structure 502 is configured to be worn on the head of a user and has a general shape and appearance (that is, form factor) of an eyeglasses (e.g., sunglasses) frame. The display system 500 has a support structure 502 (e.g., an eyeglasses frame) that frames the lenses 508, 510, either or both of which may implement the lightguide-within-a-lightguide structure of lens 102. For purposes of the following, lens 508 is an implementation of the lens 102. The support structure 502 further includes an arm 504, which houses a light engine (e.g., light engine 128, FIG. 1). Although not depicted in FIG. 5, as described above the light engine positioned adjacent to and facing an incoupler surface (e.g., incoupler surface 114, FIG. 1) of a curved lightguide (e.g., curved lightguide 106, FIG. 1) of the lens 508 and is configured to project display light (e.g., display light 126, FIG. 1) representative of sequences of images toward the eye of a user via the curved lightguide of the lens 508. The display light is incoupled to the curved lightguide via the incoupler surface and is projected through at least a part of the "length" of the curved lightguide via TIR facilitated by the use of the low index regions as described above, and the propagated display light is outcoupled through the eye-side of the optical shell (e.g., optical shell 104, FIG. 1) toward the user's eye (e.g., eye 112, FIG. 1) such that that the user perceives the projected images as being displayed in a field of view (FOV) area 506 of the lens 508. Moreover, in at least some embodiments, the display system 500 provides an augmented reality (AR) experience or mixed-reality (MR) experience in that the lenses 508 and 510 are see-through optical lenses so that ambient light (e.g., ambient light 136, FIG. 1) from the surrounding environment incident on the lenses 508, 510 is transmitted through the corresponding lens toward the user's eye. Concurrently, rendered graphical content represented in the TIR-propagated display light can be superimposed over or otherwise provided in conjunction with the real-world view as perceived by the user from the transmitted ambient light.

To this end, the support structure 502 contains or otherwise includes various components to facilitate the projection of such images toward the eye of the user, such as a projector and a lightguide. In some embodiments, the support structure 502 further includes various sensors, such as one or more front-facing cameras, rear-facing cameras, other light sensors, motion sensors, accelerometers, and the like. In some embodiments, the support structure 502 includes one or more radio frequency (RF) interfaces or other wireless interfaces, such as a Bluetooth™ interface, a WiFi interface, and the like. Further, in some embodiments, the support structure 502 further includes one or more batteries or other portable power sources for supplying power to the electrical components of the display system 500. In some embodiments, some or all of these components of the display system 500 are fully or partially contained within an inner volume of support structure 502, such as within the arm 504 in region 512 of the support structure 502. It should be noted that while an example form factor is depicted, it will be appreciated that in other embodiments the display system 500 may have a different shape and appearance from the eyeglasses frame depicted in FIG. 5.

As noted, the display system 500 employs a light engine, such as light engine 128, to generate and project display light representative of sequences of images. This light engine can include any of a variety of sources of display light, such as a laser or one or more light-emitting diodes (LEDs) and a dynamic reflector mechanism such as one or more dynamic scanners, reflective panels, or digital light processors (DLPs). As other examples, the light engine can include a micro-display panel, such as a micro-LED display panel (e.g., a micro-AMOLED display panel, or a micro inorganic LED (i-LED) display panel) or a micro-Liquid Crystal Display (LCD) display panel (e.g., a Low Temperature PolySilicon (LTPS) LCD display panel, a High Temperature PolySilicon (HTPS) LCD display panel, or an In-Plane Switching (IPS) LCD display panel). In some embodiments, the light engine includes a Liquid Crystal on Silicon (LCOS) display panel. The light engine is communicatively coupled to the controller and a non-transitory processor-readable storage medium or memory (not shown in FIG. 5) storing processor-executable instructions and other data that, when executed by the controller, cause the controller to control the operation of the light engine. In some embodiments, the controller controls the light engine to selectively set the location and size of the FOV area 506. In some embodiments, the controller is communicatively coupled to one or more processors (not shown) that generate content to be displayed at the display system 500.

Figure 6:
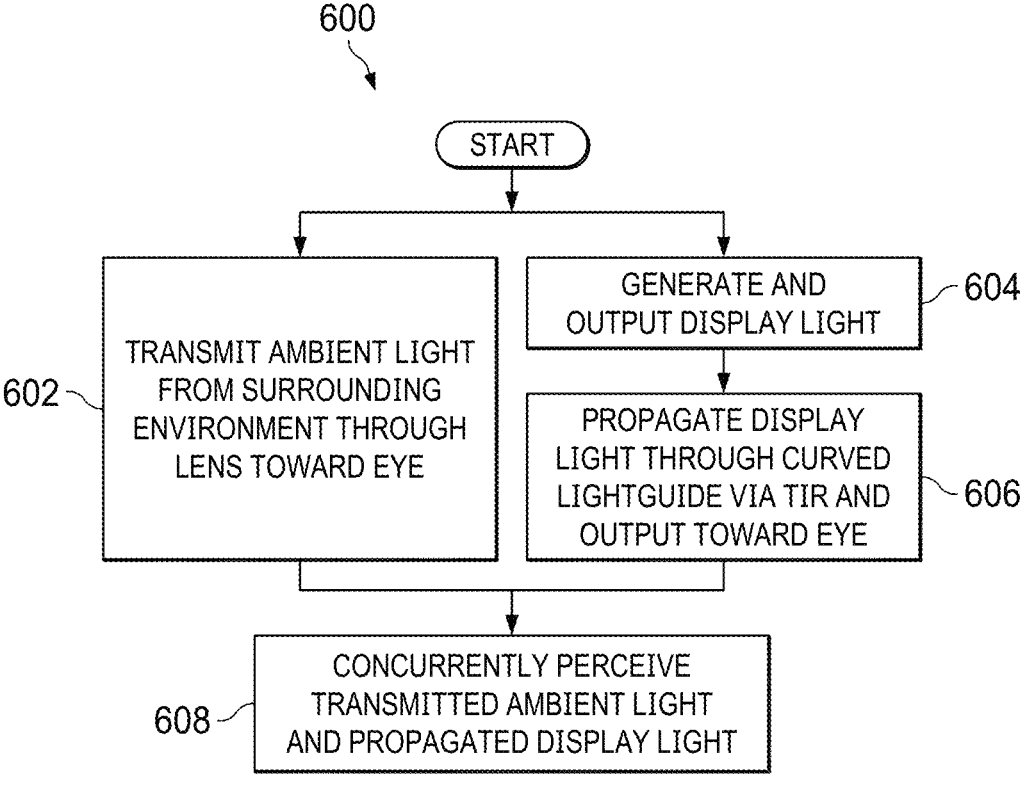
FIG. 6 is a flow diagram illustrating a method of operation of the HMD of FIG. 5 in accordance with some embodiments.

FIG. 6 is a flow diagram of a method 600 of concurrent transmission of ambient light from a surrounding environment through a lens toward a user's eye while also employing the lens as a lightguide-within-a-lightguide to propagate display light representative of one or more sequences of images from a light engine toward the user's eye. For ease of reference, the method 600 is described in the example context of the display system 500 of FIG. 5 employing the lens 508 as an implementation of the lens 102 of FIGS. 1-4.

At block 602, ambient light incident on the world-facing spherical surface 108 of the optical shell 104 of the lens 508 (as an embodiment of lens 102) is transmitted through the lens 508 (including through the optical shell 104 and the curved lightguide 106) toward the user's eye 112, thereby giving the user a view of the surrounding environment through the lens 508. Concurrently, at block 604 the light engine 128 generates and outputs display light 126 representative of display imagery. At block 606 the display light incident on the incoupler surface 114 is incoupled into the curved lightguide 106 and is propagated along at least a portion of the length of the curved lightguide 106 via TIR between the opposing freeform surfaces 118 and 120, facilitated by the relatively high difference between the refractive index n1 of the material of the curved lightguide 106 and the refractive index n2 provided by the low index regions 132 and 134. Propagated display light 126 incident on the outcoupler region 130 of the eye-side freeform surface 120 is outcoupled from the curved lightguide 106 and transmitted through the intervening material of the optical shell 104 and exits the lens 508 via the eye-side surface 110 toward the user's eye 112. At block 608, the user perceives the transmitted ambient light and the propagated display light concurrently to form an AR or MR perception of the surrounding environment and display imagery, such as perceiving the display imagery as overlaying the surrounding environment.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A lens comprising:
   an optical shell comprising a world-facing spherical surface and an opposing eye-facing surface;
   a curved lightguide disposed in the optical shell, the curved lightguide having:
   an incoupler surface;
   a first freeform surface facing the world-facing spherical surface; and
   a second freeform surface facing the eye-facing surface;
   a first low refractive index region disposed between the first freeform surface and a first conformal freeform surface of the optical shell; and
   a second low refractive index region disposed between the second freeform surface and a second conformal freeform surface of the optical shell, wherein at least one of the first low refractive index region or the second low refractive index region comprises at least one layer of nanostructures.

2. The lens of claim 1, wherein the first freeform surface, the second freeform surface, the first low refractive index region, and the second low refractive index region are configured to propagate display light received at the incoupler surface through the curved lightguide to an outcoupler region of the second freeform surface via total internal reflection.

3. The lens of claim 2, wherein the second freeform surface and the second low refractive index region are configured to permit outcoupling of the propagated display light incident on the outcoupler region of the second freeform surface.

4. The lens of claim 3, wherein the optical shell, the curved lightguide, the first low refractive index region, and the second low refractive index region are configured to transmit ambient light incident on the world-facing spherical surface toward an eye of a user of the lens.

5. A head mounted display comprising the lens of claim 4.

6. The head mounted display of claim 5, further comprising:

an eyeglasses frame containing the lens; and a light engine disposed in the eyeglasses frame and positioned proximate to, and facing, the incoupler surface, the light engine configured to generate the display light.

7. The lens of claim 1, wherein the at least one layer of nanostructures is formed in surface material of a corresponding one of the first freeform surface or the second freeform surface of the curved lightguide.

8. The lens of claim 1, wherein the at least one layer of nanostructures is formed in surface material of a corresponding one of the first conformal freeform surface or the second conformal freeform surface of the optical shell.

9. The lens of claim 1, wherein at least one of the first low refractive index region or the second low refractive index region comprises at least one low refractive index coating.

10. The lens of claim 1, wherein the first low refractive index region and the second low refractive index region each has a refractive index of no more than 1.3.

11. The lens of claim 1, wherein the first low refractive index region and the second low refractive index region each has a refractive index that is at least 0.3 less than a refractive index of an optical material of the curved lightguide.

12. The lens of claim 1, wherein the first freeform surface of the curved lightguide is coupled to the conformal first freeform surface of the optical shell and the second freeform surface of the curved lightguide is coupled to the second conformal freeform surface of the optical shell by an optical adhesive.

13. A head mounted display comprising:

a light engine configured to output display light; and a lens comprising:

an optical shell having a world-facing spherical surface and an opposing eye-facing surface; and a curved lightguide disposed in the optical shell and having an incoupler surface adjacent to the light engine, a first freeform surface facing the world-facing spherical surface, and a second freeform surface facing the eye-facing surface, wherein the curved lightguide is configured to propagate the display light from the incoupler surface to an outcoupler region of the second freeform surface via total internal reflection between the first and second freeform surfaces facilitated by a first region of nanostructures at the first freeform surface and a second region of nanostructures at the second freeform surface.

14. The head mounted display of claim 13, wherein the first freeform surface, the second freeform surface, the first region of nanostructures, and the second region of nanostructures are configured to:

propagate the display light received at the incoupler surface through the curved lightguide to an outcoupler region of the second freeform surface via total internal reflection; and permit outcoupling of the propagated display light incident on the outcoupler region of the second freeform surface.

15. The head mounted display of claim 14, wherein the optical shell, the curved lightguide, the first region of nanostructures, and the second region of nanostructures are further configured to transmit ambient light incident on the world-facing spherical surface toward an eye of a user of the lens.

16. A method of operating a head mounted display (HMD), the method comprising:

receiving display light at an incoupler surface of a curved lightguide implemented in a curved optical shell;

propagating the display light along the curved lightguide via total internal reflection between a first freeform surface of the curved lightguide that has a first low refractive index region and a second freeform surface of the curved lightguide that has a second low refractive index region;

outputting the propagated display light toward a user's eye via an outcoupler region of the second freeform surface;

transmitting ambient light incident on a first spherical surface of the curved optical shell through the curved optical shell to an opposing second surface of the curved optical shell;

outputting the transmitted ambient light from the second surface of the curved optical shell toward the user's eye; and wherein at least one of the first low refractive index region or the second low refractive index region comprises at least one of: at least one layer of nanostructures; or at least one low refractive index coating.

17. The method of claim 16, wherein the first low refractive index region and the second low refractive index region each has a refractive index of no more than 1.3.

18. The method of claim 16, wherein the first low refractive index region and the second low refractive index region each has a refractive index that is at least 0.3 less than a refractive index of an optical material of the curved lightguide.

* * * * *